(12) United States Patent
Lesso (10) Patent No.: US 11,042,617 B2
(45) Date of Patent: Jun. 22, 2021

(54) METHODS, APPARATUS AND SYSTEMS FOR BIOMETRIC PROCESSES

(71) Applicant: Cirrus Logic International Semiconductor Ltd., Edinburgh (GB)

(72) Inventor: John Paul Lesso, Edinburgh (GB)

(73) Assignee: Cirrus Logic, Inc., Austin, TX (US)

( * ) Notice: Subject to any disclaimer, the term of this patent is extended or adjusted under 35 U.S.C. 154(b) by 92 days.

(21) Appl. No.: 16/028,907

(22) Filed: Jul. 6, 2018

(65) Prior Publication Data

US 2019/0012446 A1    Jan. 10, 2019

Related U.S. Application Data

(60) Provisional application No. 62/529,736, filed on Jul. 7, 2017.

(30) Foreign Application Priority Data

Jan. 30, 2018  (GB) .................................. 1801528.9

(51) Int. Cl.
*G06F 21/00* (2013.01)
*G06F 21/32* (2013.01)
*G10K 11/178* (2006.01)

(52) U.S. Cl.
CPC ............ *G06F 21/32* (2013.01); *G10K 11/178* (2013.01)

(58) Field of Classification Search
CPC .............................. G06F 21/32; G10K 11/178
See application file for complete search history.

(56) References Cited

U.S. PATENT DOCUMENTS

| | | | |
|---|---|---|---|
| 5,197,113 | A | 3/1993 | Mumolo |
| 5,568,559 | A | 10/1996 | Makino |
| 5,710,866 | A | 1/1998 | Alleva et al. |
| 6,182,037 | B1 | 1/2001 | Maes |
| 6,229,880 | B1 | 5/2001 | Reformato et al. |
| 6,480,825 | B1 | 11/2002 | Sharma et al. |

(Continued)

FOREIGN PATENT DOCUMENTS

| | | |
|---|---|---|
| AU | 2015202397 B2 | 5/2015 |
| CN | 1937955 A | 3/2007 |

(Continued)

OTHER PUBLICATIONS

International Search Report and Written Opinion of the International Searching Authority, International Application No. PCT/GB2018/053274, dated Jan. 24, 2019.

(Continued)

*Primary Examiner* — Brandon S Hoffman
*Assistant Examiner* — William A Corum, Jr.
(74) *Attorney, Agent, or Firm* — Jackson Walker L.L.P.

(57) ABSTRACT

Embodiments of the disclosure relate to methods, apparatus and systems for biometric processes. The invention relates to initiating generation of an acoustic stimulus for application to a user's ear and extracting features for use in a biometric process from a measured response signal. The measured response signal may be used to derive one or more quality metrics and the quality metrics may be used to validate features extracted from the measured response. The quality metrics may be used to provide feedback to the user seeking to carry out the biometric process.

18 Claims, 8 Drawing Sheets

(56) References Cited

U.S. PATENT DOCUMENTS

| | | |
|---|---|---|
| 7,016,833 B2 | 3/2006 | Gable et al. |
| 7,039,951 B1 | 5/2006 | Chaudhari et al. |
| 7,418,392 B1 | 8/2008 | Mozer et al. |
| 7,492,913 B2 | 2/2009 | Connor et al. |
| 8,442,824 B2 | 5/2013 | Aley-Raz et al. |
| 8,489,399 B2 | 7/2013 | Gross |
| 8,856,541 B1 | 10/2014 | Chaudhury et al. |
| 8,997,191 B1 | 3/2015 | Stark et al. |
| 9,049,983 B1 | 6/2015 | Baldwin |
| 9,171,548 B2 | 10/2015 | Valius et al. |
| 9,305,155 B1 | 4/2016 | Vo et al. |
| 9,317,736 B1 | 4/2016 | Siddiqui |
| 9,390,726 B1 | 7/2016 | Smus et al. |
| 9,484,036 B2 | 11/2016 | Kons et al. |
| 9,548,979 B1 | 1/2017 | Johnson et al. |
| 9,641,585 B2 | 5/2017 | Kvaal et al. |
| 9,646,261 B2 | 5/2017 | Agrafioti et al. |
| 9,659,562 B2 | 5/2017 | Lovitt |
| 9,665,784 B2 | 5/2017 | Derakhshani et al. |
| 9,984,314 B2 | 5/2018 | Philipose et al. |
| 9,990,926 B1 | 6/2018 | Pearce |
| 10,032,451 B1 | 7/2018 | Mamkina et al. |
| 10,063,542 B1 | 8/2018 | Kao |
| 10,079,024 B1 | 9/2018 | Bhimanaik et al. |
| 10,097,914 B2 | 10/2018 | Petrank |
| 10,192,553 B1 | 1/2019 | Chenier et al. |
| 10,204,625 B2 | 2/2019 | Mishra et al. |
| 10,210,685 B2 | 2/2019 | Borgmeyer |
| 10,255,922 B1 | 4/2019 | Sharifi et al. |
| 10,277,581 B2 | 4/2019 | Chandrasekharan et al. |
| 10,305,895 B2 | 5/2019 | Barry et al. |
| 10,318,580 B2 | 6/2019 | Topchy et al. |
| 10,334,350 B2 | 6/2019 | Petrank |
| 10,460,095 B2 | 10/2019 | Boesen |
| 10,467,509 B2 | 11/2019 | Albadawi et al. |
| 10,733,987 B1 | 8/2020 | Govender et al. |
| 2002/0194003 A1 | 12/2002 | Mozer |
| 2003/0033145 A1 | 2/2003 | Petrushin |
| 2003/0177006 A1 | 9/2003 | Ichikawa et al. |
| 2003/0177007 A1 | 9/2003 | Kanazawa et al. |
| 2003/0182119 A1 | 9/2003 | Junqua et al. |
| 2004/0030550 A1 | 2/2004 | Liu |
| 2004/0141418 A1 | 7/2004 | Matsuo et al. |
| 2004/0230432 A1 | 11/2004 | Liu et al. |
| 2005/0060153 A1 | 3/2005 | Gable et al. |
| 2005/0171774 A1 | 8/2005 | Applebaum et al. |
| 2006/0116874 A1 | 6/2006 | Samuelsson et al. |
| 2006/0171571 A1 | 8/2006 | Chan et al. |
| 2007/0055517 A1 | 3/2007 | Spector |
| 2007/0129941 A1 | 6/2007 | Tavares |
| 2007/0185718 A1 | 8/2007 | Di Mambro et al. |
| 2007/0233483 A1 | 10/2007 | Kuppuswamy et al. |
| 2007/0250920 A1 | 10/2007 | Lindsay |
| 2008/0071532 A1 | 3/2008 | Ramakrishnan et al. |
| 2008/0082510 A1 | 4/2008 | Wang et al. |
| 2008/0223646 A1 | 9/2008 | White |
| 2008/0262382 A1 | 10/2008 | Akkermans et al. |
| 2008/0285813 A1 | 11/2008 | Holm |
| 2009/0087003 A1 | 4/2009 | Zurek et al. |
| 2009/0105548 A1 | 4/2009 | Bart |
| 2009/0167307 A1 | 7/2009 | Kopp |
| 2009/0232361 A1* | 9/2009 | Miller ............... G06K 9/00892 382/115 |
| 2009/0281809 A1 | 11/2009 | Reuss |
| 2009/0319270 A1 | 12/2009 | Gross |
| 2010/0004934 A1 | 1/2010 | Hirose et al. |
| 2010/0076770 A1 | 3/2010 | Ramaswamy |
| 2010/0204991 A1 | 8/2010 | Ramakrishnan et al. |
| 2010/0328033 A1 | 12/2010 | Kamei |
| 2011/0051907 A1 | 3/2011 | Jaiswal et al. |
| 2011/0246198 A1 | 10/2011 | Asenjo et al. |
| 2011/0276323 A1 | 11/2011 | Seyfetdinov |
| 2011/0314530 A1 | 12/2011 | Donaldson |
| 2011/0317848 A1 | 12/2011 | Ivanov et al. |
| 2012/0110341 A1 | 5/2012 | Beigi |
| 2012/0223130 A1 | 9/2012 | Knopp et al. |
| 2012/0224456 A1 | 9/2012 | Visser et al. |
| 2012/0249328 A1 | 10/2012 | Xiong |
| 2012/0323796 A1 | 12/2012 | Udani |
| 2013/0024191 A1 | 1/2013 | Krutsch et al. |
| 2013/0058488 A1 | 3/2013 | Cheng et al. |
| 2013/0080167 A1 | 3/2013 | Mozer |
| 2013/0225128 A1 | 8/2013 | Gomar |
| 2013/0227678 A1 | 8/2013 | Kang |
| 2013/0247082 A1 | 9/2013 | Wang et al. |
| 2013/0279297 A1 | 10/2013 | Wulff et al. |
| 2013/0279724 A1 | 10/2013 | Stafford |
| 2013/0289999 A1 | 10/2013 | Hymel |
| 2014/0059347 A1 | 2/2014 | Dougherty et al. |
| 2014/0149117 A1 | 5/2014 | Bakish et al. |
| 2014/0188770 A1 | 7/2014 | Agrafioti et al. |
| 2014/0237576 A1 | 8/2014 | Zhang et al. |
| 2014/0241597 A1 | 8/2014 | Leite |
| 2014/0293749 A1 | 10/2014 | Gervaise |
| 2014/0307876 A1 | 10/2014 | Agiomyrgiannakis et al. |
| 2014/0330568 A1 | 11/2014 | Lewis et al. |
| 2014/0337945 A1 | 11/2014 | Jia et al. |
| 2014/0343703 A1 | 11/2014 | Topchy et al. |
| 2015/0006163 A1 | 1/2015 | Liu et al. |
| 2015/0033305 A1 | 1/2015 | Shear et al. |
| 2015/0036462 A1 | 2/2015 | Calvarese |
| 2015/0088509 A1 | 3/2015 | Gimenez et al. |
| 2015/0089616 A1 | 3/2015 | Brezinski et al. |
| 2015/0112682 A1 | 4/2015 | Rodriguez et al. |
| 2015/0134330 A1 | 5/2015 | Baldwin et al. |
| 2015/0161370 A1 | 6/2015 | North et al. |
| 2015/0161459 A1 | 6/2015 | Boczek |
| 2015/0168996 A1 | 6/2015 | Sharpe et al. |
| 2015/0245154 A1 | 8/2015 | Dadu et al. |
| 2015/0261944 A1 | 9/2015 | Hosom et al. |
| 2015/0276254 A1 | 10/2015 | Nemcek et al. |
| 2015/0301796 A1 | 10/2015 | Visser et al. |
| 2015/0332665 A1 | 11/2015 | Mishra et al. |
| 2015/0347734 A1 | 12/2015 | Beigi |
| 2015/0356974 A1 | 12/2015 | Tani et al. |
| 2015/0371639 A1 | 12/2015 | Foerster et al. |
| 2016/0026781 A1 | 1/2016 | Boczek |
| 2016/0066113 A1 | 3/2016 | Elkhatib et al. |
| 2016/0071275 A1 | 3/2016 | Hirvonen |
| 2016/0071516 A1 | 3/2016 | Lee et al. |
| 2016/0086609 A1 | 3/2016 | Yue et al. |
| 2016/0111112 A1 | 4/2016 | Hayakawa |
| 2016/0125877 A1 | 5/2016 | Foerster et al. |
| 2016/0125879 A1 | 5/2016 | Lovitt |
| 2016/0147987 A1 | 5/2016 | Jang et al. |
| 2016/0210407 A1 | 7/2016 | Hwang et al. |
| 2016/0217321 A1 | 7/2016 | Gottlieb |
| 2016/0217795 A1 | 7/2016 | Lee et al. |
| 2016/0234204 A1 | 8/2016 | Rishi et al. |
| 2016/0314790 A1 | 10/2016 | Tsujikawa et al. |
| 2016/0324478 A1 | 11/2016 | Goldstein |
| 2016/0330198 A1 | 11/2016 | Stern et al. |
| 2016/0371555 A1 | 12/2016 | Derakhshani |
| 2017/0011406 A1 | 1/2017 | Tunnell et al. |
| 2017/0049335 A1* | 2/2017 | Duddy ................. A61B 5/0205 |
| 2017/0068805 A1 | 3/2017 | Chandrasekharan et al. |
| 2017/0078780 A1 | 3/2017 | Qian et al. |
| 2017/0110117 A1 | 4/2017 | Chakladar et al. |
| 2017/0110121 A1 | 4/2017 | Warford et al. |
| 2017/0112671 A1* | 4/2017 | Goldstein ............ A61B 5/6817 |
| 2017/0116995 A1 | 4/2017 | Ady et al. |
| 2017/0134377 A1 | 5/2017 | Tokunaga et al. |
| 2017/0161482 A1 | 6/2017 | Eltoft et al. |
| 2017/0169828 A1 | 6/2017 | Sachdev |
| 2017/0200451 A1 | 7/2017 | Booklet et al. |
| 2017/0213268 A1 | 7/2017 | Puehse et al. |
| 2017/0214687 A1 | 7/2017 | Klein et al. |
| 2017/0231534 A1 | 8/2017 | Agassy et al. |
| 2017/0256270 A1 | 9/2017 | Singaraju et al. |
| 2017/0279815 A1 | 9/2017 | Chung et al. |
| 2017/0287490 A1 | 10/2017 | Biswal et al. |
| 2017/0323644 A1 | 11/2017 | Kawato |
| 2017/0347180 A1* | 11/2017 | Petrank ................. H04R 1/1083 |
| 2017/0347348 A1* | 11/2017 | Masaki ..................... H04R 1/08 |

(56) References Cited

U.S. PATENT DOCUMENTS

| | | |
|---|---|---|
| 2017/0351487 A1 | 12/2017 | Aviles-Casco Vaquero et al. |
| 2018/0018974 A1 | 1/2018 | Zass |
| 2018/0032712 A1 | 2/2018 | Oh et al. |
| 2018/0039769 A1 | 2/2018 | Saunders et al. |
| 2018/0047393 A1 | 2/2018 | Tian et al. |
| 2018/0060557 A1 | 3/2018 | Valenti et al. |
| 2018/0096120 A1 | 4/2018 | Boesen |
| 2018/0107866 A1 | 4/2018 | Li et al. |
| 2018/0108225 A1 | 4/2018 | Mappus et al. |
| 2018/0113673 A1 | 4/2018 | Sheynblat |
| 2018/0121161 A1 | 5/2018 | Ueno et al. |
| 2018/0146370 A1 | 5/2018 | Krishnaswamy et al. |
| 2018/0166071 A1 | 6/2018 | Lee et al. |
| 2018/0174600 A1 | 6/2018 | Chaudhuri et al. |
| 2018/0176215 A1 | 6/2018 | Perotti et al. |
| 2018/0187969 A1 | 7/2018 | Kim et al. |
| 2018/0191501 A1 | 7/2018 | Lindemann |
| 2018/0232201 A1 | 8/2018 | Holtmann |
| 2018/0232511 A1 | 8/2018 | Bakish |
| 2018/0233142 A1 | 8/2018 | Koishida et al. |
| 2018/0239955 A1 | 8/2018 | Rodriguez et al. |
| 2018/0240463 A1 | 8/2018 | Perotti |
| 2018/0254046 A1 | 9/2018 | Khoury et al. |
| 2018/0289354 A1 | 10/2018 | Cvijanovic et al. |
| 2018/0292523 A1 | 10/2018 | Orenstein et al. |
| 2018/0308487 A1 | 10/2018 | Goel et al. |
| 2018/0336716 A1 | 11/2018 | Ramprashad et al. |
| 2018/0336901 A1 | 11/2018 | Masaki et al. |
| 2018/0358020 A1 | 12/2018 | Chen et al. |
| 2018/0366124 A1 | 12/2018 | Cilingir et al. |
| 2018/0374487 A1 | 12/2018 | Lesso |
| 2019/0005963 A1 | 1/2019 | Alonso et al. |
| 2019/0005964 A1 | 1/2019 | Alonso et al. |
| 2019/0013033 A1 | 1/2019 | Bhimanaik et al. |
| 2019/0027152 A1 | 1/2019 | Huang et al. |
| 2019/0030452 A1 | 1/2019 | Fassbender et al. |
| 2019/0042871 A1 | 2/2019 | Pogorelik |
| 2019/0065478 A1 | 2/2019 | Tsujikawa et al. |
| 2019/0098003 A1 | 3/2019 | Ota |
| 2019/0114496 A1 | 4/2019 | Lesso |
| 2019/0114497 A1 | 4/2019 | Lesso |
| 2019/0115030 A1 | 4/2019 | Lesso |
| 2019/0115032 A1 | 4/2019 | Lesso |
| 2019/0115033 A1 | 4/2019 | Lesso |
| 2019/0115046 A1 | 4/2019 | Lesso |
| 2019/0147888 A1 | 5/2019 | Lesso |
| 2019/0149932 A1 | 5/2019 | Lesso |
| 2019/0180014 A1 | 6/2019 | Kovvali et al. |
| 2019/0197755 A1 | 6/2019 | Vats |
| 2019/0199935 A1 | 6/2019 | Danielsen et al. |
| 2019/0228778 A1 | 7/2019 | Lesso |
| 2019/0228779 A1 | 7/2019 | Lesso |
| 2019/0246075 A1 | 8/2019 | Khadloya et al. |
| 2019/0260731 A1 | 8/2019 | Chandrasekharan et al. |
| 2019/0294629 A1 | 9/2019 | Wexler et al. |
| 2019/0295554 A1 | 9/2019 | Lesso |
| 2019/0304470 A1 | 10/2019 | Ghaeemaghami et al. |
| 2019/0306594 A1* | 10/2019 | Aumer .................. G08B 21/18 |
| 2019/0311722 A1 | 10/2019 | Caldwell |
| 2019/0313014 A1 | 10/2019 | Welbourne et al. |
| 2019/0318035 A1 | 10/2019 | Blanco et al. |
| 2019/0356588 A1 | 11/2019 | Shahraray et al. |
| 2019/0371330 A1 | 12/2019 | Lin et al. |
| 2019/0373438 A1 | 12/2019 | Amir et al. |
| 2019/0392145 A1 | 12/2019 | Komogortsev |
| 2019/0394195 A1 | 12/2019 | Chari et al. |
| 2020/0035247 A1 | 1/2020 | Boyadjiev et al. |
| 2020/0204937 A1 | 6/2020 | Lesso |
| 2020/0227071 A1 | 7/2020 | Lesso |
| 2020/0265834 A1 | 8/2020 | Lesso et al. |

FOREIGN PATENT DOCUMENTS

| | | |
|---|---|---|
| CN | 104956715 A | 9/2015 |
| CN | 105185380 A | 12/2015 |
| CN | 105702263 A | 6/2016 |
| CN | 105869630 A | 8/2016 |
| CN | 105913855 A | 8/2016 |
| CN | 105933272 A | 9/2016 |
| CN | 105938716 A | 9/2016 |
| CN | 106297772 A | 1/2017 |
| CN | 106531172 A | 3/2017 |
| EP | 1205884 A2 | 5/2002 |
| EP | 1701587 A1 | 9/2006 |
| EP | 1928213 A1 | 6/2008 |
| EP | 1965331 A2 | 9/2008 |
| EP | 2660813 A1 | 11/2013 |
| EP | 2704052 A2 | 3/2014 |
| EP | 2860706 A2 | 4/2015 |
| EP | 3016314 A1 | 5/2016 |
| EP | 3156978 A1 | 4/2017 |
| GB | 2375205 A | 11/2002 |
| GB | 2493849 A | 2/2013 |
| GB | 2499781 A | 9/2013 |
| GB | 2515527 A | 12/2014 |
| GB | 2541466 A | 2/2017 |
| GB | 2551209 A | 12/2017 |
| JP | 2003058190 A | 2/2003 |
| JP | 2006010809 A | 1/2006 |
| JP | 2010086328 A | 4/2010 |
| WO | 9834216 A2 | 8/1998 |
| WO | 02/103680 A2 | 12/2002 |
| WO | 2006054205 A1 | 5/2006 |
| WO | 2007034371 A2 | 3/2007 |
| WO | 2008113024 A1 | 9/2008 |
| WO | 2010066269 A1 | 6/2010 |
| WO | 2013022930 A1 | 2/2013 |
| WO | 2013154790 A1 | 10/2013 |
| WO | 2014040124 A1 | 3/2014 |
| WO | 2015117674 A1 | 8/2015 |
| WO | 2015163774 A1 | 10/2015 |
| WO | 2016003299 A1 | 1/2016 |
| WO | 2017055551 A | 4/2017 |
| WO | 2017203484 A1 | 11/2017 |

OTHER PUBLICATIONS

Beigi, Homayoon, "Fundamentals of Speaker Recognition," Chapters 8-10, ISBN: 978-0-378-77592-0; 2011.
Li, Lantian et al., "A Study on Replay Attack and Anti-Spoofing for Automatic Speaker Verification", Interspeech 2017, Jan. 1, 2017, pp. 92-96.
Li, Zhi et al., "Compensation of Hysteresis Nonlinearity in Magnetostrictive Actuators with Inverse Multiplicative Structure for Preisach Model", IEE Transactions on Automation Science and Engineering, vol. 11, No. 2, Apr. 1, 2014, pp. 613-619.
Partial International Search Report of the International Searching Authority, International Application No. PCT/GB2018/052905, dated Jan. 25, 2019.
Further Search Report under Sections 17 (6), UKIPO, Application No. GB1719731.0, dated Nov. 26, 2018.
Combined Search and Examination Report, UKIPO, Application No. GB1713695.3, dated Feb. 19, 2018.
Zhang et al., An Investigation of Deep-Learing Frameworks for Speaker Verification Antispoofing—IEEE Journal of Selected Topics in Signal Processes, Jun. 1, 2017.
Combined Search and Examination Report under Sections 17 and 18(3), UKIPO, Application No. GB1804843.9, dated Sep. 27, 2018.
Wu et al., Anti-Spoofing for text-Independent Speaker Verification: An Initial Database, Comparison of Countermeasures, and Human Performance, IEEE/ACM Transactions on Audio, Speech, and Language Processing, Issue Date: Apr. 2016.
Combined Search and Examination Report under Sections 17 and 18(3), UKIPO, Application No. GB1803570.9, dated Aug. 21, 2018.
Combined Search and Examination Report under Sections 17 and 18(3), UKIPO, Application No. GB1801661.8, dated Jul. 30, 2018.
Combined Search and Examination Report under Sections 17 and 18(3), UKIPO, Application No. GB1801663.4, dated Jul. 18, 2018.
Combined Search and Examination Report under Sections 17 and 18(3), UKIPO, Application No. GB1801684.2, dated Aug. 1, 2018.

(56) References Cited

OTHER PUBLICATIONS

Combined Search and Examination Report under Sections 17 and 18(3), UKIPO, Application No. GB1719731.0, dated May 16, 2018.
Combined Search and Examination Report, UKIPO, Application No. GB1801874.7, dated Jul. 25, 2018.
Combined Search and Examination Report under Sections 17 and 18(3), UKIPO, Application No. GB1801659.2, dated Jul. 26, 2018.
International Search Report and Written Opinion of the International Searching Authority, International Application No. PCT/GB2018/052906, dated Jan. 14, 2019.
International Search Report and Written Opinion of the International Searching Authority, International Application No. PCT/GB2019/050185, dated Apr. 2, 2019.
Combined Search and Examination Report under Sections 17 and 18(3), UKIPO, Application No. GB1809474.8, dated Jul. 23, 2018.
Ajmera, et al,, "Robust Speaker Change Detection," IEEE Signal Processing Letters, vol. 11, No. 8, pp. 649-651, Aug. 2004.
International Search Report and Written Opinion of the International Searching Authority, International Application No. PCT/GB2018/051760, dated Aug. 3, 2018.
International Search Report and Written Opinion of the International Searching Authority, International Application No. PCT/GB2018/051787, dated Aug. 16, 2018.
Villalba, Jesus et al., Preventing Replay Attacks on Speaker Verification Systems, International Carnahan Conference on Security Technology (ICCST), 2011 IEEE, Oct. 18, 2011, pp. 1-8.
International Search Report and Written Opinion of the International Searching Authority, International Application No. PCT/GB2018/051765, dated Aug. 16, 2018.
Combined Search and Examination Report under Sections 17 and 18(3), UKIPO, Application No. GB1713697.9, dated Feb. 20, 2018.
Chen et al., "You Can Hear But You Cannot Steal: Defending Against Voice Impersonation Attacks on Smartphones", Proceedings of the International Conference on Distributed Computing Systems, PD: 20170605.
International Search Report and Written Opinion of the International Searching Authority, International Application No. PCT/GB2018/052907, dated Jan. 15, 2019.
Combined Search and Examination Report under Sections 17 and 18(3), UKIPO, Application No. GB1713699.5, dated Feb. 21, 2018.
Lim, Zhi Hao et al., An Investigation of Spectral Feature Partitioning for Replay Attacks Detection, Proceedings of APSIPA Annual Summit and Conference 2017, Dec. 12-15, 2017, Malaysia, pp. 1570-1573.
International Search Report and Written Opinion of the International Searching Authority, International Application No. PCT/GB2019/052302, dated Oct. 2, 2019.
Liu, Yuan et al., "Speaker verification with deep features", Jul. 2014, in International Joint Conference on Neural Networks (IJCNN), pp. 747-753, IEEE.
International Search Report and Written Opinion of the International Searching Authority, International Application No. PCT/GB2018/051927, dated Sep. 25, 2018.
Combined Search and Examination Report under Sections 17 and 18(3), UKIPO, Application No. 1801530.5, dated Jul. 25, 2018.
International Search Report and Written Opinion of the International Searching Authority, International Application No. PCT/GB2018/051924, dated Sep. 26, 2018.
Combined Search and Examination Report under Sections 17 and 18(3), UKIPO, Application No. 1801526.3, dated Jul. 25, 2018.
International Search Report and Written Opinion of the International Searching Authority, International Application No. PCT/GB2018/051931, dated Sep. 27, 2018.
Combined Search and Examination Report under Sections 17 and 18(3), UKIPO, Application No. 1801527.1, dated Jul. 25, 2018.
International Search Report and Written Opinion of the International Searching Authority, International Application No. PCT/GB2019/051928, dated Dec. 3, 2019.
Combined Search and Examination Report under Sections 17 and 18(3), UKIPO, Application No. 1801532.1, dated Jul. 25, 2018.
International Search Report and Written Opinion of the International Searching Authority, International Application No. PCT/GB2019/052143, dated Sep. 17, 2019.
International Search Report and Written Opinion of the International Searching Authority, International Application No. PCT/GB2018/051925, dated Sep. 26, 2018.
Combined Search and Examination Report under Sections 17 and 18(3), UKIPO, Application No. GB1801528.9, dated Jul. 25, 2018.
Ohtsuka, Takahiro and Kasuya, Hideki, Robust ARX Speech Analysis Method Taking Voice Source Pulse Train Into Account, Journal of the Acoustical Society of Japan, 58, 7, pp. 386-397, 2002.
Wikipedia, Voice (phonetics), https://en.wikipedia.org/wiki/Voice_(phonetics), accessed Jun. 1, 2020.
Zhang et al., DolphinAttack: Inaudible Voice Commands, Retrieved from Proceedings of the 2017 ACM SIGSAC Conference on Computer and Communications Security, Aug. 2017.
Song, Liwei, and Prateek Mittal, Poster: Inaudible Voice Commands, Proceedings of the 2017 ACM SIGSAC Conference on Computer and Communications Security, Aug. 2017.
Fortuna, Andrea, [Online], DolphinAttack: inauadible voice commands allow attackers to control Siri, Alexa and other digital assistants, Sep. 2017.
Lucas, Jim, What is Electromagnetic Radiation?, Mar. 13, 2015, Live Science, https://www.livescience.com/38169-electromagnetism.html, pp. 1-11 (Year 2015).
Brownlee, Jason, A Gentle Introduction to Autocorrelation and Partial Autocorrelation, Feb. 6, 2017, https://machinelearningmastery.com/gentle-introduction-autocorrelation-partial-autocorrelation/, accessed Apr. 28, 2020.
First Office Action, China National Intellectual Property Administration, Patent Application No. 2018800418983, dated May 29, 2020.
International Search Report and Written Opinion, International Application No. PCT/GB2020/050723, dated Jun. 16, 2020.
Liu, Yuxi et al., "Earprint: Transient Evoked Otoacoustic Emission for Biometrics", IEEE Transactions on Information Forensics and Security, IEEE, Piscataway, NJ, US, vol. 9, No. 12, Dec. 1, 2014, pp. 2291-2301.
Seha, Sherif Nagib Abbas et al., "Human recognition using transient auditory evoked potentials: a preliminary study", IET Biometrics, IEEE, Michael Faraday House, Six Hills Way, Stevenage, HERTS., UK, vol. 7, No. 3, May 1, 2018, pp. 242-250.
Liu, Yuxi et al., "Biometric identification based on Transient Evoked Otoacoustic Emission", IEEE International Symposium on Signal Processing and Information Technology, IEEE, Dec. 12, 2013, pp. 267-271.
Toth, Arthur R., et al., Synthesizing Speech from Doppler Signals, ICASSP 2010, IEEE, pp. 4638-4641.
Boesen, U.S. Appl. No. 62/403,045, filed Sep. 30, 2017.
Meng, Y. et al., "Liveness Detection for Voice User Interface via Wireless Signals in IoT Environment," in IEEE Transactions on Dependable and Secure Computing, doi: 10.1109/TDSC.2020.2973620.
Zhang, L. et al., Hearing Your Voice is Not Enough: An Articulatory Gesture Based Liveness Detection for Voice Authentication, CCS '17: Proceedings of the 2017 ACM SIGSAC Conference on Computer and Communications Security, Oct. 2017 pp. 57-71.
First Office Action, China National Intellectual Property Administration, Application No. 2018800720846, dated Mar. 1, 2021.

* cited by examiner

METHODS, APPARATUS AND SYSTEMS FOR BIOMETRIC PROCESSES

TECHNICAL FIELD

Embodiments of the disclosure relate to methods, apparatus and systems for biometric processes, and particularly to methods, apparatus and systems for biometric processes involving the measured response of a user's ear to an acoustic stimulus.

BACKGROUND

It is known that the acoustic properties of a user's ear, whether the outer parts (known as the pinna or auricle), the ear canal or both, differ substantially between individuals and can therefore be used as a biometric to identify the user. One or more loudspeakers or similar transducers positioned close to or within the ear generate an acoustic stimulus, and one or more microphones similarly positioned close to or within the ear detect the acoustic response of the ear to the acoustic stimulus. One or more features may be extracted from the response signal, and used to characterize an individual.

For example, the ear canal is a resonant system, and therefore one feature which may be extracted from the response signal is the resonant frequency of the ear canal. If the measured resonant frequency (i.e. in the response signal) differs from a stored resonant frequency for the user, a biometric algorithm coupled to receive and analyse the response signal may return a negative result. Other features of the response signal may be similarly extracted and used to characterize the individual. For example, the features may comprise one or more mel frequency cepstrum coefficients. More generally, the transfer function between the acoustic stimulus and the measured response signal (or features of the transfer function) may be determined, and compared to a stored transfer function (or stored features of the transfer function) which is characteristic of the user.

One problem associated with ear biometric systems is that the signal to noise ratio of the measured response signal is typically quite low as the biometric features of the signal are relatively weak. This problem can be exacerbated depending on a number of factors. For example, the user may be present in a noisy environment. For example, earphones used to acquire the ear biometric data may be poorly fitted to the user's ear (e.g. inserted too far into the user's ear, or not sufficiently inserted).

Alternatively or additionally, nefarious third parties may seek to bypass the authentication system by using a fabricated signal.

SUMMARY

Embodiments of the present disclosure seek to overcome these and other problems.

According to one aspect of the present disclosure, there is provided a method in a biometric authentication system, the method comprising: initiating generation of an acoustic stimulus for application to a user's ear, extracting, from a response signal of the user's ear to the acoustic stimulus, one or more features for use in a biometric process, calculating one or more quality metrics derived from the response signal, and validating the one or more features for use in the biometric process as a function of the one or more quality metrics.

In another aspect, there is provided a method in a biometric authentication system, the method comprising: initiating generation of an acoustic stimulus for application to a user's ear, extracting, from a response signal of the user's ear to the acoustic stimulus, one or more features for use in a biometric process, calculating one or more quality metrics derived from the response signal, and providing feedback to the user based on the one or more quality metrics.

A further aspect provides a method in a biometric authentication system, the method comprising: obtaining ear biometric data for use in a biometric process, calculating one or more quality metrics derived from the ear biometric data, and validating the one or more features for use in the biometric process as a function of the one or more quality metrics.

Another aspect provides a method in a biometric authentication system, the method comprising: obtaining ear biometric data for use in a biometric process, calculating one or more quality metrics derived from the ear biometric data, and providing feedback to the user based on the one or more quality metrics.

The disclosure also provides an apparatus for performing biometric processes, the apparatus comprising an ear biometric module for obtaining ear biometric data for use in a biometric process, a quality measure module for calculating one or more quality metrics derived from the ear biometric data; and a decision module for validating the one or more features for use in the biometric process as a function of the one or more quality metrics.

A further aspect of the disclosure provides an apparatus for performing one or more biometric processes, the apparatus comprising: an ear biometric module for obtaining ear biometric data for use in a biometric process, a quality measure module for calculating one or more quality metrics derived from the ear biometric data, and a feedback module for providing feedback to the user based on the one or more quality metrics.

In another aspect of the disclosure, there is provided a biometric authentication apparatus, comprising: a biometric module for performing a biometric process, a stimulus module for generation of an acoustic stimulus, a loudspeaker for application of the acoustic stimulus to a user's ear, a microphone for detecting a response signal of the user's ear to the acoustic stimulus, a feature extraction module for extracting from the response signal one or more features for use in a biometric process, a quality metric module for calculating one or more quality metric from the response signal, and a decision module for providing an indication of the validity for use in the biometric process of the extracted features as a function of the one or more quality metrics.

BRIEF DESCRIPTION OF THE DRAWINGS

For a better understanding of examples of the present disclosure, and to show more clearly how the examples may be carried into effect, reference will now be made, by way of example only, to the following drawings in which.

DETAILED DESCRIPTION

As noted above, ear biometric data may be acquired by the generation of an acoustic stimulus, and the detection of an acoustic response of the ear to the acoustic stimulus. One or more features may be extracted from the response signal, and used to characterize the individual.

The acoustic stimulus may be generated and the response measured using a personal audio device. As used herein, the term "personal audio device" is any electronic device which is suitable for, or configurable to, provide audio playback substantially to only a single user. Some examples of suitable personal audio devices are shown in FIGS. 1a to 1e.

Figure 1A:
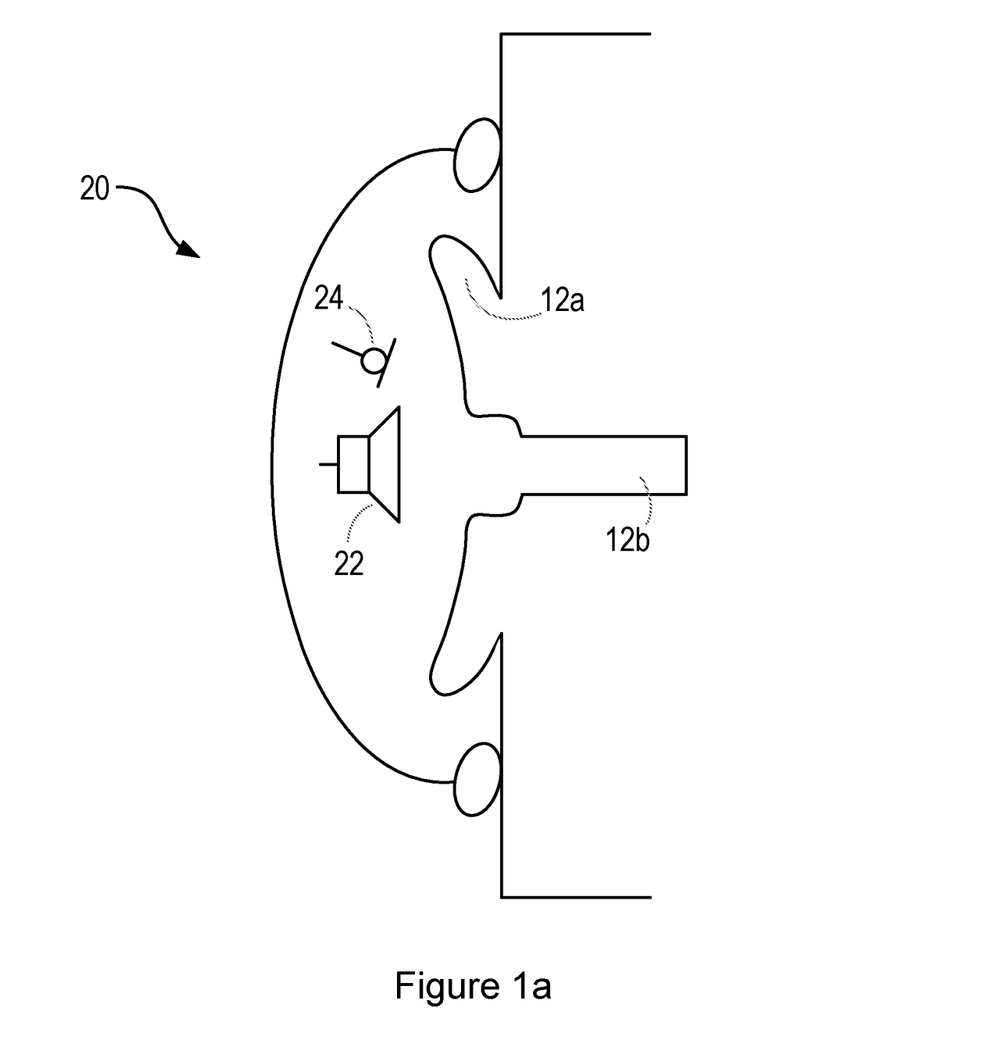
FIGS. 1a to 1e show examples of personal audio devices.

FIG. 1a shows a schematic diagram of a user's ear, comprising the (external) pinna or auricle 12a, and the (internal) ear canal 12b. A personal audio device 20 comprising a circum-aural headphone is worn by the user over the ear. The headphone comprises a shell which substantially surrounds and encloses the auricle 12a, so as to provide a physical barrier between the user's ear and the external environment. Cushioning or padding may be provided at an edge of the shell, so as to increase the comfort of the user, and also the acoustic coupling between the headphone and the user's skin (i.e. to provide a more effective barrier between the external environment and the user's ear).

The headphone comprises one or more loudspeakers 22 positioned on an internal surface of the headphone, and arranged to generate acoustic signals towards the user's ear and particularly the ear canal 12b. The headphone further comprises one or more microphones 24, also positioned on the internal surface of the headphone, arranged to detect acoustic signals within the internal volume defined by the headphone, the auricle 12a and the ear canal 12b.

The headphone may be able to perform active noise cancellation, to reduce the amount of noise experienced by the user of the headphone. Active noise cancellation operates by detecting a noise (i.e. with a microphone), and generating a signal (i.e. with a loudspeaker) that has the same amplitude as the noise signal but is opposite in phase. The generated signal thus interferes destructively with the noise and so lessens the noise experienced by the user. Active noise cancellation may operate on the basis of feedback signals, feedforward signals, or a combination of both. Feedforward active noise cancellation utilizes one or more microphones on an external surface of the headphone, operative to detect the environmental noise before it reaches the user's ear. The detected noise is processed quickly, and the cancellation signal generated so as to match the incoming noise as it arrives at the user's ear. Feedback active noise cancellation utilizes one or more error microphones positioned on the internal surface of the headphone, operative to detect the combination of the noise and the audio playback signal generated by the one or more loudspeakers. This combination is used in a feedback loop, together with knowledge of the audio playback signal, to adjust the cancelling signal generated by the loudspeaker and so reduce the noise. The microphone 24 shown in FIG. 1a may therefore form part of an active noise cancellation system, for example, as an error microphone.

Figure 1B:
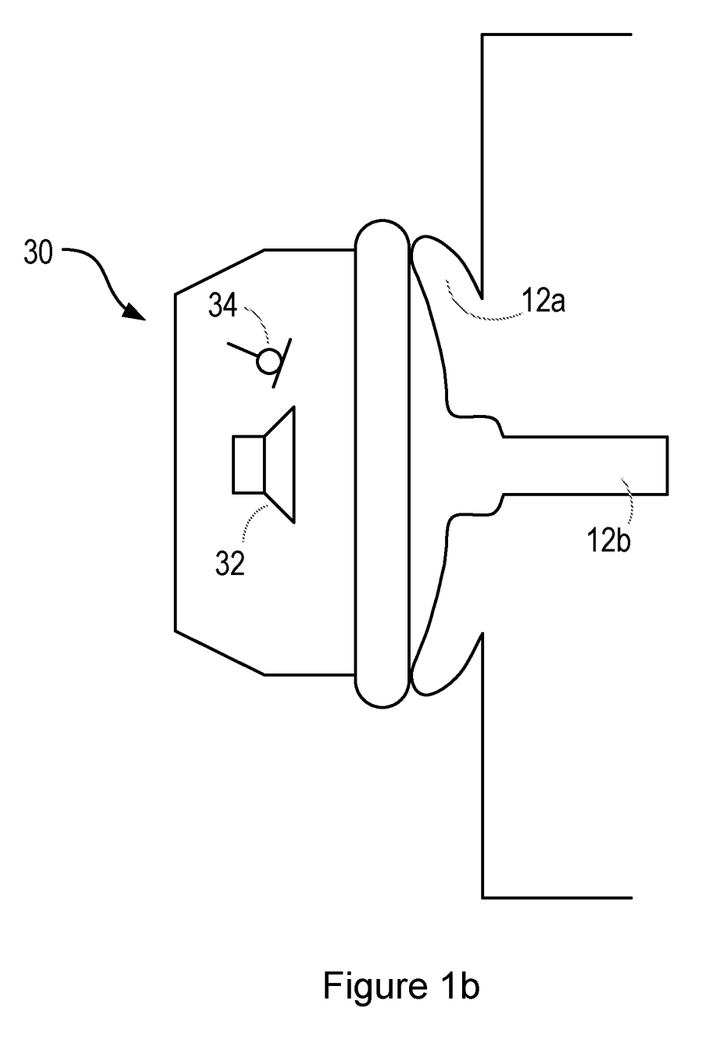

FIG. 1b shows an alternative personal audio device 30, comprising a supra-aural headphone. The supra-aural headphone does not surround or enclose the user's ear, but rather sits on the auricle 12a. The headphone may comprise a cushion or padding to lessen the impact of environmental noise. As with the circum-aural headphone shown in FIG. 1a, the supra-aural headphone comprises one or more loudspeakers 32 and one or more microphones 34. The loudspeaker(s) 32 and the microphone(s) 34 may form part of an active noise cancellation system, with the microphone 34 serving as an error microphone.

Figure 1C:
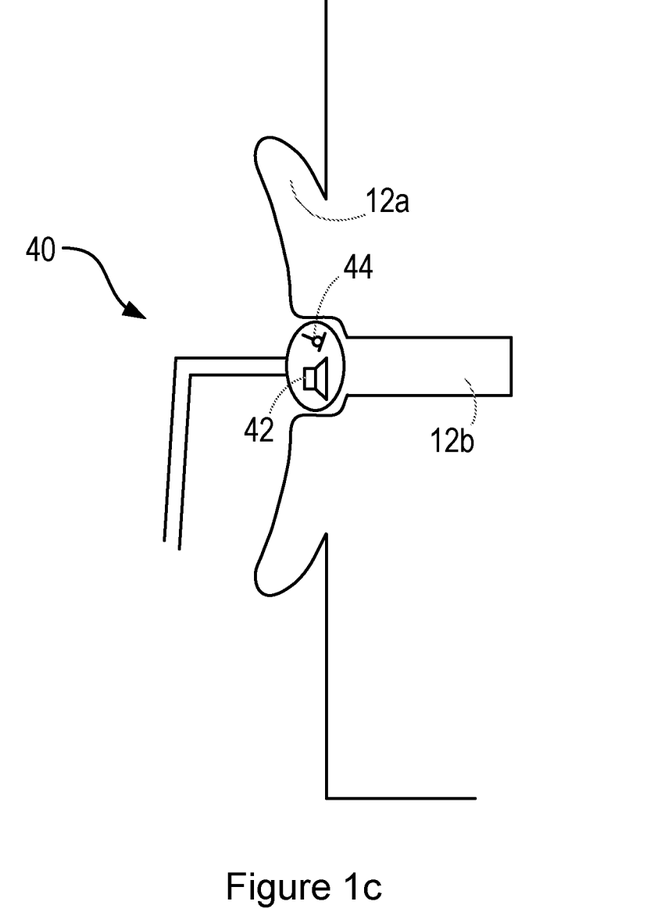

FIG. 1c shows a further alternative personal audio device 40, comprising an intra-concha headphone (or earphone). In use, the intra-concha headphone sits inside the user's concha cavity. The intra-concha headphone may fit loosely within the cavity, allowing the flow of air into and out of the user's ear canal 12b.

As with the devices shown in FIGS. 1a and 1b, the intra-concha headphone comprises one or more loudspeakers 42 and one or more microphones 44, which may form part of an active noise cancellation system.

Figure 1D:
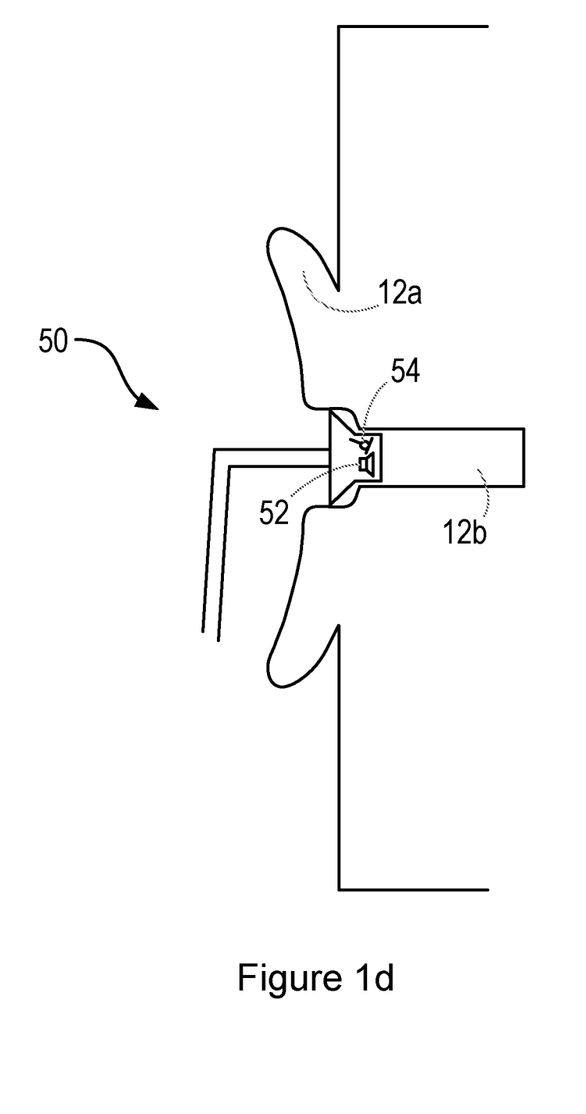

FIG. 1d shows a further alternative personal audio device 50, comprising an in-ear headphone (or earphone), insert headphone, or ear bud. This headphone is configured to be partially or totally inserted within the ear canal 12b, and may provide a relatively tight seal between the ear canal 12b and the external environment (i.e. it may be acoustically closed or sealed). The headphone may comprise one or more loudspeakers 52 and one or more microphones 54, as with the other devices described above, and these components may form part of an active noise cancellation system.

As the in-ear headphone may provide a relatively tight acoustic seal around the ear canal 12b, external noise (i.e. coming from the environment outside) detected by the microphone 54 is likely to be low.

Figure 1E:
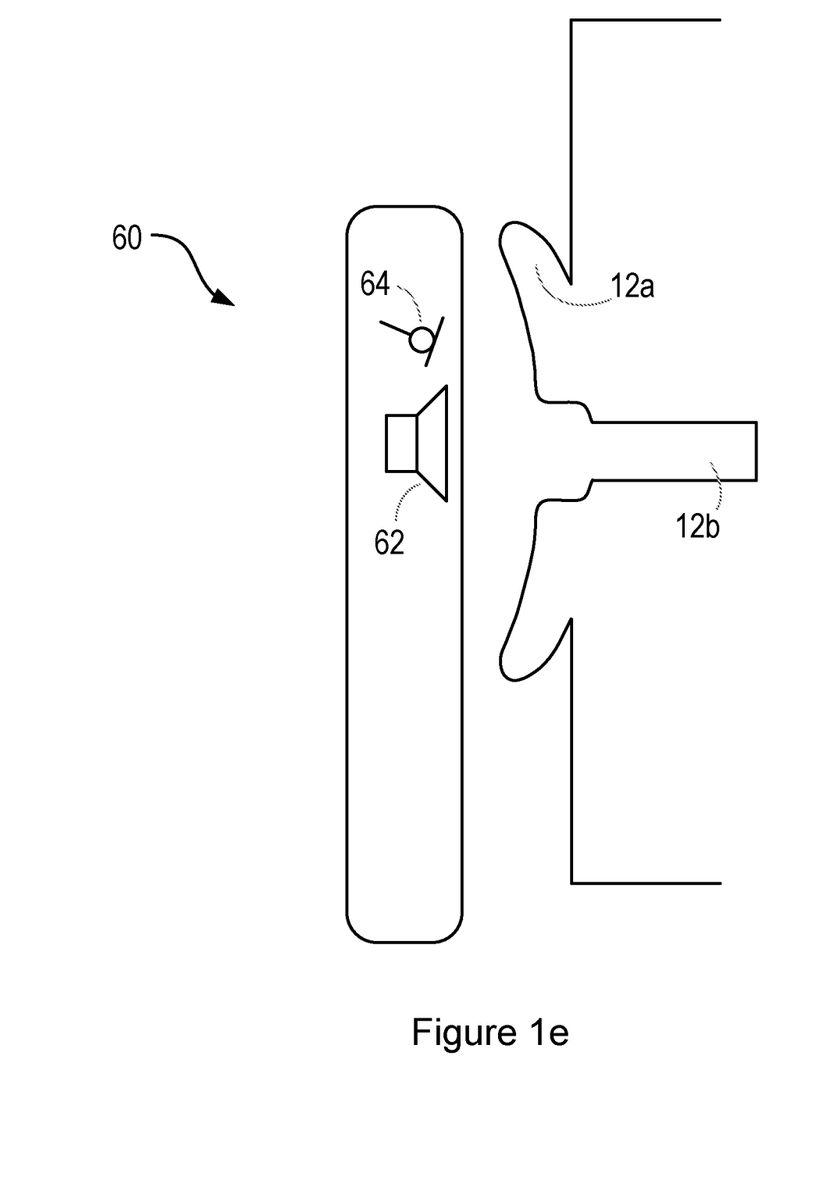

FIG. 1e shows a further alternative personal audio device 60, which is a mobile or cellular phone or handset. The handset 60 comprises one or more loudspeakers 62 for audio playback to the user, and one or more microphones 64 which are similarly positioned.

In use, the handset 60 is held close to the user's ear so as to provide audio playback (e.g. during a call). While a tight acoustic seal is not achieved between the handset 60 and the user's ear, the handset 60 is typically held close enough that an acoustic stimulus applied to the ear via the one or more loudspeakers 62 generates a response from the ear which can be detected by the one or more microphones 64. As with the other devices, the loudspeaker(s) 62 and microphone(s) 64 may form part of an active noise cancellation system.

All of the personal audio devices described above thus provide audio playback to substantially a single user in use. Each device comprises one or more loudspeakers and one or more microphones, which may be utilized to generate biometric data related to the frequency response of the user's ear. The loudspeaker is operable to generate an acoustic stimulus, or acoustic probing wave, towards the user's ear, and the microphone is operable to detect and measure a response of the user's ear to the acoustic stimulus, e.g. to measure acoustic waves reflected from the ear canal or the pinna. The acoustic stimulus may be sonic (for example in the audio frequency range of say 20 Hz to 20 kHz) or ultra-sonic (for example greater than 20 kHz or in the range 20 kHz to 50 kHz) or near-ultrasonic (for example in the range 15 kHz to 25 kHz) in frequency. In some examples the microphone signal may be processed to measure received signals of the same frequency as that transmitted.

Another biometric marker may comprise otoacoustic noises emitted by the cochlear in response to the acoustic stimulus waveform. The otoacoustic response may comprise a mix of the frequencies in the input waveform. For example if the input acoustic stimulus consists of two tones at frequencies f1 and f2, the otoacoustic emission may include a component at frequency 2*f1−f2. The relative power of frequency components of the emitted waveform has been shown to be a useful biometric indicator. In some examples therefore the acoustic stimulus may comprise tones of two or more frequencies and the amplitude of mixing products at sums or differences of integer-multiple frequencies generated by otoacoustic emissions from the cochlear may be measured. Alternatively, otoacoustic emissions may be stimulated and measured by using stimulus waveforms comprising fast transients, e.g. clicks.

Depending on the construction and usage of the personal audio device, the measured response may comprise user-specific components, i.e. biometric data relating to the auricle 12a, the ear canal 12b, or a combination of both the auricle 12a and the ear canal 12b. For example, the circumaural headphones shown in FIG. 1a will generally acquire data relating to the auricle 12a and potentially also the ear canal 12b. The insert headphones shown in FIG. 1d will generally acquire data relating only to the ear canal 12b.

One or more of the personal audio devices described above (or rather, the microphones within those devices) may be operable to detect bone-conducted voice signals from the user. That is, as the user speaks, sound is projected away from the user's mouth through the air. However, acoustic vibrations will also be carried through part of the user's skeleton or skull, such as the jaw bone. These acoustic vibrations may be coupled to the ear canal 12b through the jaw or some other part of the user's skeleton or skull, and detected by the microphone. Lower frequency sounds tend to experience a stronger coupling than higher frequency sounds, and voiced speech (i.e. that speech or those phonemes generated while the vocal cords are vibrating) is coupled more strongly via bone conduction than unvoiced speech (i.e. that speech or those phonemes generated while the vocal cords are not vibrating). The in-ear headphone 50 may be particularly suited to detecting bone-conducted speech owing to the tight acoustic coupling around the ear canal 12b.

All of the devices shown in FIGS. 1a to 1e and described above may be used to implement aspects of the disclosure.

Figure 2:
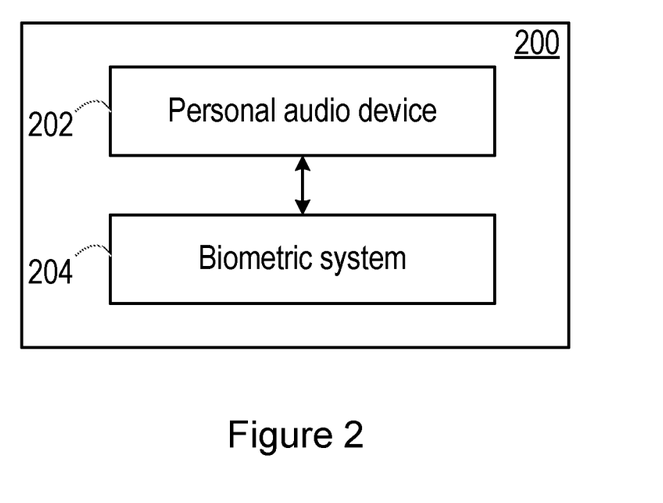
FIG. 2 shows an arrangement according to embodiments of the disclosure.

FIG. 2 shows an arrangement 200 according to embodiments of the disclosure. The arrangement 200 comprises a personal audio device 202 and a biometric system 204. The personal audio device 202 may be any device which is suitable for, or configurable to provide audio playback to substantially a single user. The personal audio device 202 generally comprises one or more loudspeakers, and one or more microphones which, in use, are positioned adjacent to or within a user's ear. The personal audio device 202 may be wearable, and comprise headphones for each of the user's ears. Alternatively, the personal audio device 202 may be operable to be carried by the user, and held adjacent to the user's ear or ears during use. The personal audio device 202 may comprise headphones or a mobile phone handset, as described above with respect to any of FIGS. 1a to 1e.

The biometric system 204 is coupled to the personal audio device 202 and operative to control the personal audio device 202 to acquire biometric data which is indicative of the individual using the personal audio device 202.

The personal audio device 202 thus generates an acoustic stimulus for application to the user's ear, and detects or measures the response of the ear to the acoustic stimulus. For example, the acoustic stimulus may be in the sonic range, or ultra-sonic. In some embodiments, the acoustic stimulus may have a flat frequency spectrum over a relevant frequency range, or be preprocessed in such a way that those frequencies that allow for a good discrimination between individuals are emphasized (i.e. have a higher amplitude than other frequencies). The measured response corresponds to the reflected signal received at the one or more microphones, with certain frequencies being reflected at higher amplitudes than other frequencies owing to the particular response of the user's ear.

The biometric system 204 may send suitable control signals to the personal audio device 202, so as to initiate the acquisition of biometric data, and receive data from the personal audio device 202 corresponding to the measured response. The biometric system 204 is operable to extract one or more features from the measured response and utilize those features as part of a biometric process.

Some examples of suitable biometric processes include biometric enrolment and biometric authentication. Enrolment comprises the acquisition and storage of biometric data which is characteristic of an individual. In the present context, such stored data may be known as an "ear print". Authentication (sometimes referred to as verification or identification) comprises the acquisition of biometric data from an individual, and the comparison of that data to the stored ear prints of one or more enrolled or authorised users. A positive comparison (i.e. a determination that the acquired data matches or is sufficiently close to a stored ear print) results in the individual being authenticated. For example, the individual may be permitted to carry out a restricted action, or granted access to a restricted area or device. A negative comparison (i.e. a determination that the acquired data does not match or is not sufficiently close to a stored ear print) results in the individual not being authenticated. For example, the individual may not be permitted to carry out the restricted action, or granted access to the restricted area or device.

The biometric system 204 may, in some embodiments, form part of the personal audio device 202 itself. Alternatively, the biometric system 204 may form part of an electronic host device (e.g. an audio player) to which the personal audio device 202 is coupled, through wires or wirelessly. In yet further embodiments, operations of the biometric system 204 may be distributed between circuitry in the personal audio device 202 and the electronic host device.

According to embodiments of the disclosure, the biometric system 204 is further operable to calculate one or more quality metrics of the biometric data. These may be derived from the measured response of the user's ear. For example, the quality metrics may relate to the measured response itself, to a Fourier transform of the measured response, or to the one or more features extracted from the measured response.

According to a first aspect of the disclosure, the calculated quality metric(s) may be used to validate the extracted feature(s) for use in the biometric process. If the features are not validated for use in the biometric process, the biometric process may be not carried out or, if already started, the biometric process may be halted. In a further alternative, the result of the biometric process may be validated or invalidated based on the one or more calculated quality metrics. For example, a biometric enrolment may be annulled, even if it was otherwise successful in extracting the required features to generate the ear print. For example, a biometric authentication result may be invalidated or made negative, even if the authentication result was otherwise positive.

Further detail regarding this aspect is provided below with respect to FIGS. 3 and 4.

According to a second aspect of the disclosure, the calculated quality metric(s) may be used for the provision of feedback to the individual seeking to carry out the biometric process. For example, feedback may be provided in the form of instructions to move to a less noisy environment, to stop talking, or to reposition the personal audio device 202. Further detail regarding this aspect is also provided below with respect to FIGS. 3 and 4.

Figure 3:
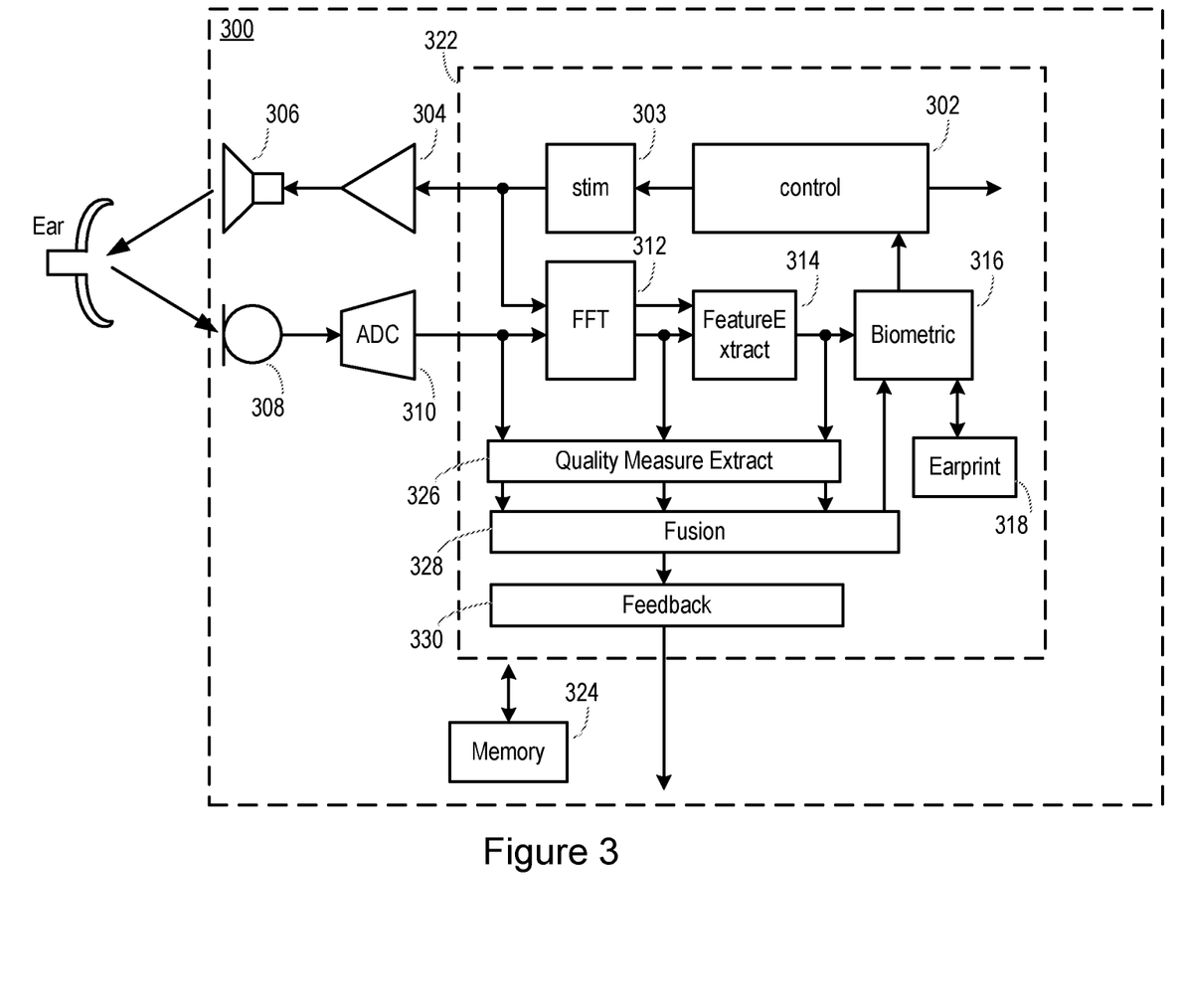
FIG. 3 shows a system according to embodiments of the disclosure.

FIG. 3 shows a system 300 according to embodiments of the disclosure.

The system 300 comprises processing circuitry 322, which may comprise one or more processors, such as a central processing unit or an applications processor (AP), or a digital signal processor (DSP).

The one or more processors may perform methods as described herein on the basis of data and program instructions stored in memory 324. Memory 324 may be provided as a single component or as multiple components or co-integrated with at least some of processing circuitry 322. Specifically, the methods described herein can be performed in processing circuitry 322 by executing instructions that are stored in non-transient form in the memory 324, with the program instructions being stored either during manufacture of the system 300 or personal audio device 202 or by upload while the system or device is in use.

The processing circuitry 322 comprises a stimulus generator module 303 which is coupled directly or indirectly to an amplifier 304, which in turn is coupled to a loudspeaker 306.

The stimulus generator module 303 generates an electrical audio signal and provides the electrical audio signal to the amplifier 304, which amplifies it and provides the amplified signal to the loudspeaker 306. The loudspeaker 306 generates a corresponding acoustic signal which is output to the user's ear (or ears). The audio signal may be sonic or ultra-sonic, for example. The audio signal may have a flat frequency spectrum, or be preprocessed in such a way that those frequencies that allow for a good discrimination between individuals are emphasized (i.e. have a higher amplitude than other frequencies).

As noted above, the audio signal may be output to all or a part of the user's ear (i.e. the auricle 12a or the ear canal 12b). The audio signal is reflected off the ear, and the reflected signal (or echo signal) is detected and received by a microphone 308. The reflected signal thus comprises data which is characteristic of the individual's ear, and suitable for use as a biometric.

The reflected signal is passed from the microphone 308 to an analogue-to-digital converter (ADC) 310, where it is converted from the analogue domain to the digital domain. Of course, in alternative embodiments the microphone 308 may be a digital microphone and produce a digital data signal (which does not therefore require conversion to the digital domain).

The signal is detected by the microphone 308 in the time domain. However, the features extracted for the purposes of the biometric process may be in the frequency domain (in that it is the frequency response of the user's ear which is characteristic). The system 300 therefore comprises a Fourier transform module 312, which converts the reflected signal to the frequency domain. For example, the Fourier transform module 312 may implement a fast Fourier transform (FFT).

The transformed signal is then passed to a feature extract module 314, which extracts one or more features of the transformed signal for use in a biometric process (e.g. biometric enrolment, biometric authentication, etc.). For example, the feature extract module 314 may extract the resonant frequency of the user's ear. For example, the feature extract module 314 may extract one or more mel frequency cepstrum coefficients. Alternatively, the feature extract module 314 may determine the frequency response of the user's ear at one or more predetermined frequencies, or across one or more ranges of frequencies.

The extracted feature(s) are passed to a biometric module 316, which performs a biometric process on them. For example, the biometric module 316 may perform a biometric enrolment, in which the extracted features (or parameters derived therefrom) are stored as part of biometric data, i.e., as an ear print 318 which is characteristic of the individual. The ear print 318 may be stored within the system 300 or remote from the system 300 (and accessible securely by the biometric module 316). In another example, the biometric module 316 may perform a biometric authentication, and compare the one or more extract features to corresponding features in a stored ear print 318 (or multiple stored ear prints) for authorised users.

The biometric module 316 generates a biometric result (which may be the successful or unsuccessful generation of an ear print, as well as successful or unsuccessful authentication) and outputs the result to control module 302.

In some embodiments the stimulus waveforms may be tones of predetermined frequency and amplitude. In other embodiments the stimulus generator module 303 may be configurable to apply music to the loudspeaker 306, e.g., normal playback operation, and the feature extract module may be configurable to extract the response or transfer function from whatever signal components the stimulus waveform contains.

Thus in some embodiments the feature extract module 314 may be designed with foreknowledge of the nature of the stimulus, for example knowing the spectrum of the applied stimulus signal, so that the response or transfer function may be appropriately normalised. In other embodiments the feature extract module 314 may comprise a second input to monitor the stimulus (e.g. playback music) and hence provide the feature extract module 314 with information about the stimulus signal or its spectrum so that the feature extract module 314 may calculate the transfer function from the stimulus waveform stimulus to received acoustic waveform from which it may derive the desired feature parameters. In the latter case, the stimulus signal may also pass to the feature extract module 314 via the FFT module 312.

According to embodiments of the disclosure, the system 300 further comprises a quality measure module 326, which is operative to calculate one or more quality metrics derived from the reflected signal received by the microphone 308. The one or more quality metrics may comprise one or more quality metrics which relate to the reflected signal itself, in the time domain (i.e. calculated based directly on the output of the ADC 310 or the microphone 308) or the frequency domain (i.e. calculated based on the output of the Fourier transform module 312). Alternatively or additionally, the one or more quality metrics may comprise one or more metrics which relate to the extracted features (i.e. calculated based on the output of the feature extract module 314).

The quality measure module 326 is thus coupled to receive signals corresponding to the output of one or more of: the microphone 308; the ADC 310, the Fourier transform module 312; and the feature extract module 314; and to calculate one or more quality metrics based thereon.

For example, the quality measure module 326 may calculate one or more of the following quality metrics based on the reflected signal in the time domain:

Clipping. The quality measure module 326 may determine the presence or absence of clipping in the reflected signal (i.e. where the microphone 308 is driven beyond its operative range of amplitude). The presence of clipping may indicate that the biometric process should be invalidated, as the quality of data in the signal is not sufficient.

Asymmetry. The quality measure module 326 may determine the presence and extent of any asymmetry between positive and negative durations of the reflected signal waveform. For example, the quality measure module 326 may determine a difference in average power for the positive and negative durations of the waveform. The metric may be used to assess phase and non-linear distortion, and may be an indicator of near-overload in the microphone (i.e. as opposed to clipping, in which overload has occurred).

Signal to noise ratio (SNR). The noise may be determined or estimated based on a voice activity detector (VAD), which determines the presence of a voice signal in the reflected signal (i.e. because the user is speaking, or near another person who is speaking). Alternatively the VAD may operate on the basis of the signal generated by a separate voice microphone (not illustrated). The VAD may be used to gate the reflected signal measured in the microphone 308, such that noise is measured or estimated at times when no voice is present in the output of the microphone. The SNR can then be estimated based on the measured reflected signal and the estimated noise. A low SNR may be used to invalidate the use of the features in the biometric process.

Silence detect—if signal is unexpectedly low (regardless of noise)—may be symptom of full or partial microphone blockage by wax/dirt/moisture.

Speech detection. If a voice signal is detected in the reflected signal or a contemporaneously captured voice signal (e.g. as detected by a VAD), the features extracted from the reflected signal may be invalidated.

The quality measure module 326 may calculate one or more of the following quality metrics based on the reflected signal in the frequency domain:

SNR. As above, albeit characterised in the frequency domain rather than the amplitude domain.

Spectral tilt. The quality measure module 326 may determine the spectral tilt, e.g., the slope of the power spectral density. Spectral tilt can be used to identify loss of low-frequency power due to leakage or loss of spectral discrimination due to a high noise floor.

Spectral Peaking. The quality measure module 326 may determine the number of spectral peaks, or the density of spectral peaks. Spectral peaking can be used to determine: a) if the microphone is in the ear, i.e. the number/density/approximate location of spectral peaks is as expected for an ear; and/or b) if there is some strong (external) interferer coupling to the detected response.

Energy per bin, e.g., the energy in each bin, where each bin defines a range of frequency. The individual values for the bins may be determined, or the mean value of all or a subset of the bins determined by the quality measure module 326. In the former case, the energy per bin may provide a more detailed indication (i.e. more detailed than spectral peaking) as to whether the overall shape of the frequency spectrum is as generally expected for an in-ear microphone, or whether the spectrum is impacted by general interference, or say low frequency noise or high frequency noise. For example, general non-speech movements of the mouth, such as eating, chewing, or teeth chattering, may generate such noise.

Variability of energy per bin. The quality measure module 326 may determine the variability of energy of one or more particular bins (e.g. one or more frequencies or frequency ranges) over time. This parameter can be used to assess how stationary (stable) a noise source is, and thus to decide how stable other metrics are or may be. The variability may be assessed only for noise signals, and thus the measurement may be taken during gaps in speech (e.g., as determined by a VAD). Alternatively, the measurement may be used synergistically with the VAD, e.g., as variability may indicate interfering speech. For example a bandpass filter (e.g. for a frequency range of 2-8 kHz) may be applied to the energy bin samples to provide an ongoing value whose peak-to-peak variability is used as a metric.

One or more of these quality metrics may be indicative of a noisy environment (e.g., high SNR, or high energy per bin), or poor fit of the personal audio device to the user's ear (e.g., high spectral flatness), or a fabricated signal (e.g., abnormal spectral peaking). Note that the quality metric(s) may be determined on all of the reflected signal (i.e. all frequencies) or only a portion of the signal (i.e. a particular frequency band or bands).

The quality measure module 326 may calculate one or more of the following quality metrics based on statistical measures of distributions of the extracted feature(s) over time, for example arithmetic mean, geometric mean, standard deviation, skew, kurtosis, difference between median and mean, ratio of lower decile to standard deviation.

These features may similarly be indicative of a noisy environment (e.g. if the mean extracted feature is too high) or poor fit (e.g., if the mean extracted feature or standard deviation is too low).

In further embodiments, the quality measure module 326 may comprise quality features not directly related to the stimulus signal. For example, a liveness detector, operative to determine whether the individual seeking to carry out the biometric process is alive or not. For example, the personal audio device (or the host electronic device) may comprise a thermometer which determines the temperature of the individual. If the temperature is not sufficiently close to body temperature, the liveness detector indicates that the individual is not alive (e.g. is some hardware being used to spoof a user's acoustic ear characteristics).

In further examples, the personal audio device or the host device may comprise a heart rate monitor (e.g. the microphone 308 or a pulse oximeter) or an accelerometer operative to determine whether the individual is alive or not. If the individual is not alive (as indicated by the liveness detector), the features may be invalidated for use in the biometric process.

The quality measure module 326 may comprise an in-ear detect module, operable to determine whether the loudspeaker 306 and/or the microphone 308 are positioned within or adjacent to the user's ear. Various mechanisms are suitable for such a purpose. For example, the signal detected by the microphone 308 may be analysed to determine whether it is characteristic of a small volume (i.e. the volume inside the ear canal and/or within a headphone shell). For example, an optical mechanism in the personal audio device may detect the presence of light and so conclude that the personal audio device has been removed from the user's head. For example, an accelerometer in the personal audio device may detect movement which is consistent or which is inconsistent with the motion of a user's head. For example, a pressure sensor, for instance a piezo-resistive or piezoelectric sensor, may detect pressure exerted on fitting an ear bud into an ear canal. For example, a capacitance sensor may detect the proximity of the ear to the personal audio device. For example, a temperature sensor may detect the warmth of the tissue of the ear canal or the warmth of the air in the ear canal cavity.

If the loudspeaker 306 and/or the microphone 308 are not positioned within or adjacent to the user's ear, the extracted features may be invalidated for use in the biometric process.

Additionally or alternatively, the in-ear detect module may be utilized to determine the time since the last previous in-ear detection status change, i.e. the time since the last previous detection of placement of the loudspeaker 306 and/or the microphone 308 in or adjacent to the user's ear. Upon placement of the personal audio device over or in the user's ears, the internal volume defined by the personal audio device will gradually settle at a temperature which is at or close to body temperature (e.g., around 35° C.). A changing temperature may affect the measurement of biometric data, and thus measurements which are taken too soon after placement of the personal audio device (i.e., while the temperature has not reached a steady state) may be unreliable. This will especially be the case in a cold environment. Thus features which are extracted during that time (e.g., before a temperature has been reached, or before a time threshold has passed since placement of the personal audio device) may be invalidated for use in the biometric process.

Thus the quality measure module 326 determines or calculates one or more quality metrics derived from the measured response signal. The quality metrics are provided to a decision or fusion module 328, which determines whether to validate or invalidate the features for use in the biometric process. The description of different quality metrics above provides some discussion as to the likely impact of particular detected values of the quality metrics on the decision to validate or invalidate. In some embodiments, the decision module 328 may determine to validate or invalidate on the basis of a single quality metric, e.g., by comparing that quality metric value to a threshold. In other embodiments, the decision module 328 may combine multiple quality metrics and compare those metrics to multiple thresholds. In such embodiments, the features may be validated if one, more than one, or all of the quality metrics compare favourably to the thresholds. In still further embodiments, the decision module 328 may implement the results of a machine-learning algorithm to recognise quality metric values or combinations of quality metric values for which the features shall be invalidated. The machine-learning algorithm may be trained on a large sample group of data, prior to use of the system 300 in the field. For example, the machine-learning algorithm may implement a naïve Bayes algorithm, or a neural network.

On the basis of the calculated quality metric(s), the decision module 328 outputs an indication to as to whether the extracted features are valid or invalid for use in the biometric process. In the illustrated embodiment, the indication is output to the biometric module 316 itself, which can then halt a biometric process which is already underway, prevent a biometric process from being carried out, or alter the result of a biometric process which was previously carried out. Alternatively, the indication may be output to a separate module, such as the processing circuitry 322 or a control module (not illustrated), which ensures that the result of a biometric process is not respected if the features are invalidated.

In a further aspect, the decision module 328 generates an output for a feedback module 330 indicating why the features were invalidated (e.g., why the biometric process failed). The feedback module 330 is operative to provide feedback to the user (e.g., through the loudspeaker 306, or via a display). For example, based on the calculated quality metric(s), the decision module may decide to invalidate the extracted features because the noise level in the reflected signal is too high. If the noise level is too high, the extracted features will not be representative of the user's ear. In such circumstances, the decision module 328 may output to the feedback module 330 an indication that the noise level is too high, and this can be fed back to the user. For example, the user may be provided with an instruction to move to a less noisy environment. Similarly, the extracted features may be invalidated because a voice signal was detected, and the feedback module operative to provide an instruction for the user to stop talking. In a further example, the features may be invalidated because the personal audio device is incorrectly positioned in or next to the user's ear (for example, the detected signal may be too weak or comprise suspiciously low low-frequency energy due to acoustic leakage). The user may be provided with feedback in the form of an instruction to reposition the personal audio device. Other instructions fed back to the user may include instructions to stop moving their jaws (e.g., chewing, tensing, etc.), or to reposition themselves (e.g., to stand up or sit up straight, as opposed to lying down), as such detected conditions can affect the ear canal and any associated biometric information.

The system 300 may be provided within a personal audio device (such as the personal audio device 202), or may be distributed across multiple devices. In the former case, all functional blocks other than the loudspeaker 306 and the microphone 308 may be provided on one or more integrated circuits. In the latter case, one or more (or all) of the functional blocks other than the loudspeaker 306 and the microphone 308 may be provided in a host electronic device (e.g. on one or more integrated circuits). In either case, the microphone may also be co-integrated with one or more functional blocks, such as one or more of the ADC 310, the Fourier transform module 312, and the feature extract module 314.

Figure 4:
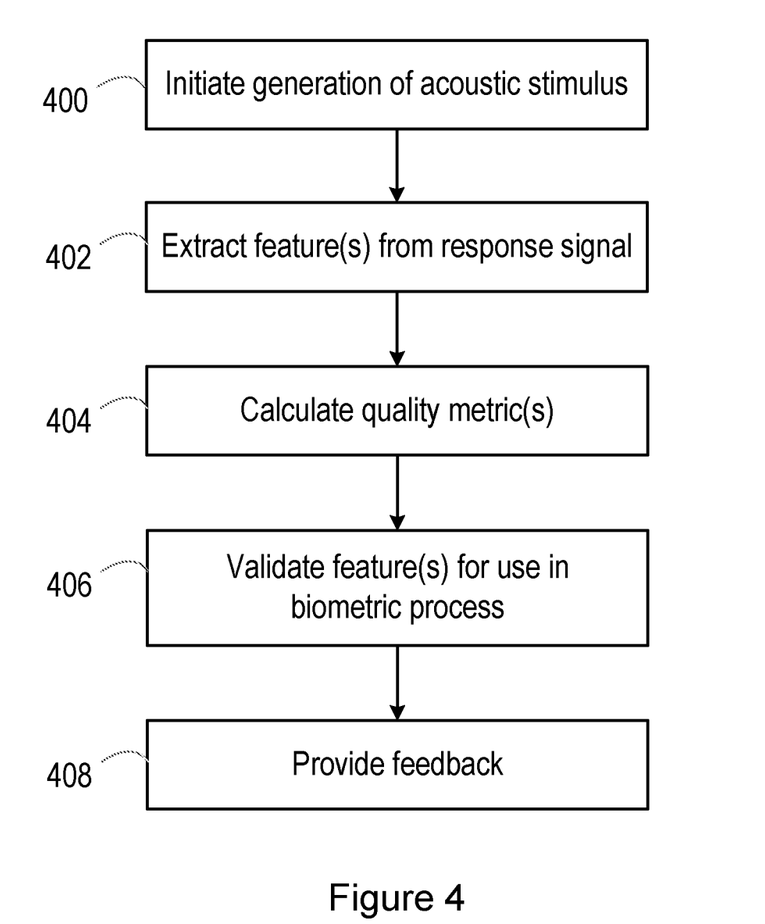
FIG. 4 is a method according to embodiments of the disclosure.

FIG. 4 is a method according to embodiments of the disclosure. The method may be carried out in a biometric system, such as the system 204 or the system 300.

In step 400, the biometric system initiates generation of an acoustic stimulus towards a user's ear. The stimulus may be directed towards the outer part of the ear (i.e. the auricle), the ear canal, or both.

In step 402, the biometric system extracts one or more features from the measured response signal to the acoustic stimulus for use in a biometric process (e.g., authentication, enrolment, etc.). For example, the one or more features may comprise one or more of: the resonant frequency; the frequency response; and one or more mel frequency cepstral coefficients.

In step 404, the biometric system calculates one or more quality metrics derived from the measured response signal. The quality metrics may be calculated from the measured response signal itself (whether in the time domain of the frequency domain), or from the features extracted in step 402.

In step 406, the biometric system determines, on the basis of the calculated quality metric(s), whether the features extracted in step 402 should be validated for use in the biometric process. For example, the biometric system may compare the quality metric(s) to one or more thresholds. In a further example, the biometric system may implement the results of a machine-learning algorithm to recognize quality metrics which mandate that extracted features should be validated or invalidated for use in the biometric process.

In step 408, the biometric system provides feedback to the user based on the calculated quality metric(s) and/or the decision to validate or invalidate the features for use in the biometric process. Feedback may be provided in particular when the features are invalidated in step 406.

Thus systems, apparatus and methods are provided for use in an ear biometric system which take into account one or more quality metrics of the measured response signal. Thus, even where a biometric algorithm may authenticate or enrol the user based on a particular response signal, the quality metric(s) may be used to invalidate the biometric process.

Embodiments may be implemented in an electronic, portable and/or battery powered host device such as a smartphone, an audio player, a mobile or cellular phone, a handset. Embodiments may be implemented on one or more integrated circuits provided within such a host device. Embodiments may be implemented in a personal audio device configurable to provide audio playback to a single person, such as a smartphone, a mobile or cellular phone, headphones, earphones, etc. See FIGS. 1*a* to 1*e*. Again, embodiments may be implemented on one or more integrated circuits provided within such a personal audio device. In yet further alternatives, embodiments may be implemented in a combination of a host device and a personal audio device. For example, embodiments may be implemented in one or more integrated circuits provided within the personal audio device, and one or more integrated circuits provided within the host device.

It should be understood—especially by those having ordinary skill in the art with the benefit of this disclosure—that the various operations described herein, particularly in connection with the figures, may be implemented by other circuitry or other hardware components. The order in which each operation of a given method is performed may be changed, and various elements of the systems illustrated herein may be added, reordered, combined, omitted, modified, etc. It is intended that this disclosure embrace all such modifications and changes and, accordingly, the above description should be regarded in an illustrative rather than a restrictive sense.

Similarly, although this disclosure makes reference to specific embodiments, certain modifications and changes can be made to those embodiments without departing from the scope and coverage of this disclosure. Moreover, any benefits, advantages, or solutions to problems that are described herein with regard to specific embodiments are not intended to be construed as a critical, required, or essential feature or element.

Further embodiments and implementations likewise, with the benefit of this disclosure, will be apparent to those having ordinary skill in the art, and such embodiments should be deemed as being encompassed herein. Further, those having ordinary skill in the art will recognize that various equivalent techniques may be applied in lieu of, or in conjunction with, the discussed embodiments, and all such equivalents should be deemed as being encompassed by the present disclosure.

The skilled person will recognise that some aspects of the above-described apparatus and methods, for example the discovery and configuration methods may be embodied as processor control code, for example on a non-volatile carrier medium such as a disk, CD- or DVD-ROM, programmed memory such as read only memory (Firmware), or on a data carrier such as an optical or electrical signal carrier. For many applications embodiments of the invention will be implemented on a DSP (Digital Signal Processor), ASIC (Application Specific Integrated Circuit) or FPGA (Field Programmable Gate Array). Thus the code may comprise conventional program code or microcode or, for example code for setting up or controlling an ASIC or FPGA. The code may also comprise code for dynamically configuring re-configurable apparatus such as re-programmable logic gate arrays. Similarly the code may comprise code for a hardware description language such as Verilog™ or VHDL (Very high speed integrated circuit Hardware Description Language). As the skilled person will appreciate, the code may be distributed between a plurality of coupled components in communication with one another. Where appropriate, the embodiments may also be implemented using code running on a field-(re)programmable analogue array or similar device in order to configure analogue hardware.

Note that as used herein the term module shall be used to refer to a functional unit or block which may be implemented at least partly by dedicated hardware components such as custom defined circuitry and/or at least partly be implemented by one or more software processors or appropriate code running on a suitable general purpose processor or the like. A module may itself comprise other modules or functional units. A module may be provided by multiple components or sub-modules which need not be co-located and could be provided on different integrated circuits and/or running on different processors.

It should be noted that the above-mentioned embodiments illustrate rather than limit the invention, and that those skilled in the art will be able to design many alternative embodiments without departing from the scope of the appended claims or embodiments. The word "comprising" does not exclude the presence of elements or steps other than those listed in a claim or embodiment, "a" or "an" does not exclude a plurality, and a single feature or other unit may fulfil the functions of several units recited in the claims or embodiments. Any reference numerals or labels in the claims or embodiments shall not be construed so as to limit their scope.

The invention claimed is:

1. A method in a biometric authentication system, the method comprising:
   initiating generation of an acoustic stimulus for application to a user's ear;
   extracting, from a response signal of the user's ear to the acoustic stimulus, one or more features for use in a biometric process;
   determining a quality of the response signal or a part thereof by calculating one or more quality metrics of the response signal or the part thereof, wherein the one or more quality metrics of the response signal comprise one or more of: clipping; waveform asymmetry; signal-to-noise ratio, SNR; spectral tilt; spectral peaking; energy in one or more frequency bins; and energy variability of one or more frequency bins; and
   validating the one or more features for use in the biometric process as a function of the one or more quality metrics.

2. The method according to claim 1, further comprising:
   providing feedback to the user based on the one or more quality metrics.

3. The method according to claim 2, wherein providing feedback comprises providing instructions to the user to perform one or more of:
   moving to a quieter environment;

repositioning a personal audio device for the generation of the acoustic stimulus and the detection of the response signal;

stopping talking.

4. The method according to claim 1, wherein the biometric process is one of: biometric enrolment and biometric authentication.

5. The method according to claim 4, wherein biometric enrolment comprises generating and storing a unique model for the user based on the one or more features.

6. The method according to claim 4, wherein biometric authentication comprises comparing the one or more features to a unique model for the user.

7. The method according to claim 1, wherein the one or more quality metrics comprise one or more quality metrics of the response signal in a time domain or frequency domain.

8. The method according to claim 1, wherein the one or more quality metrics comprise one or more quality metrics of the one or more features.

9. The method according to claim 8, wherein the one or more quality metrics comprise one or more statistical measures of one or more of the features.

10. The method according to claim 1, wherein validating the one or more features for use in the biometric process comprises validating an output of the biometric process.

11. The method according to claim 1, wherein validating the one or more features for use in the biometric process comprises initiating or preventing the biometric process.

12. The method according to claim 1, wherein the biometric authentication system comprises a personal audio device having at least one transducer for the generation of the acoustic stimulus, and at least one microphone for the detection of the response signal.

13. The method according to claim 12, wherein the at least one microphone for the detection of the response signal is further configured to detect an error signal for use in an active noise cancellation system.

14. The method according to claim 13, wherein the at least one microphone is operable as an error microphone for the active noise cancellation system.

15. The method according to claim 1, wherein the acoustic stimulus comprises an audio playback signal.

16. The method according to claim 1, wherein the one or more features are extracted from the measured response based on the acoustic stimulus.

17. An electronic apparatus, comprising processing circuitry and a non-transitory machine-readable medium storing instructions which, when executed by the processing circuitry, cause the electronic apparatus to:

initiate generation of an acoustic stimulus for application to a user's ear;

extract, from a response signal of the user's ear to the acoustic stimulus, one or more features for use in a biometric process;

determine a quality of the response signal or a part thereof by calculating one or more quality metrics of the response signal or a part thereof, and the one or more quality metrics of the response signal comprise one or more of: clipping; waveform asymmetry; signal-to-noise ratio, SNR; spectral tilt; spectral peaking; energy in one or more frequency bins; and energy variability of one or more frequency bins; and validate the one or more features for use in the biometric process as a function of the one or more quality metrics.

18. A non-transitory machine-readable medium storing instructions which, when executed by processing circuitry, cause an electronic apparatus to:

initiate generation of an acoustic stimulus for application to a user's ear;

extract, from a response signal of the user's ear to the acoustic stimulus, one or more features for use in a biometric process;

determine a quality of the response signal or a part thereof by calculating one or more quality metrics of the response signal or a part thereof, and the one or more quality metrics of the response signal comprise one or more of: clipping; waveform asymmetry; signal-to-noise ratio, SNR; spectral tilt; spectral peaking; energy in one or more frequency bins; and energy variability of one or more frequency bins; and validate the one or more features for use in the biometric process as a function of the one or more quality metrics.

* * * * *